United States Patent
Schmidt et al.

(10) Patent No.: US 9,719,587 B2
(45) Date of Patent: Aug. 1, 2017

(54) HYDRAULIC AXLE

(71) Applicant: Robert Bosch GmbH, Stuttgart (DE)

(72) Inventors: Stefan Schmidt, Lohr (DE); Gottfried Hendrix, Gemuenden (DE)

(73) Assignee: Robert Bosch GmbH, Stuttgart (DE)

( * ) Notice: Subject to any disclaimer, the term of this patent is extended or adjusted under 35 U.S.C. 154(b) by 290 days.

(21) Appl. No.: 14/578,393

(22) Filed: Dec. 20, 2014

(65) Prior Publication Data
US 2015/0176613 A1 Jun. 25, 2015

(30) Foreign Application Priority Data
Dec. 23, 2013 (DE) .................. 10 2013 227 053

(51) Int. Cl.
| F15B 15/06 | (2006.01) |
| F16H 43/00 | (2006.01) |
| F15B 11/036 | (2006.01) |
| F15B 13/02 | (2006.01) |
| F15B 11/024 | (2006.01) |
| F15B 1/02 | (2006.01) |
| F15B 11/02 | (2006.01) |

(52) U.S. Cl.
CPC .............. *F16H 43/00* (2013.01); *F15B 1/024* (2013.01); *F15B 11/022* (2013.01); *F15B 11/024* (2013.01); *F15B 11/036* (2013.01); *F15B 13/021* (2013.01); *F15B 2211/20515* (2013.01); *F15B 2211/20561* (2013.01); *F15B 2211/27* (2013.01); *F15B 2211/3058* (2013.01); *F15B 2211/625* (2013.01); *F15B 2211/7055* (2013.01); *F15B 2211/775* (2013.01); *F15B 2211/785* (2013.01)

(58) Field of Classification Search
CPC ........ B30B 15/161; F16H 43/00; F15B 1/021; F15B 1/024; F15B 11/022; F15B 11/024; F15B 11/036; F15B 13/021; F15B 15/06; F15B 15/08; F15B 15/1404; F15B 15/1466; F15B 2211/20515; F15B 2211/20561; F15B 2211/27; F15B 2211/30505; F15B 2211/3058; F15B 2211/613; F15B 2211/625; F15B 2211/7055; F15B 2211/775; F15B 2211/785
See application file for complete search history.

(56) References Cited

U.S. PATENT DOCUMENTS 8,720,197 B2 * 5/2014 Persson ................. E02F 9/2217
60/456

FOREIGN PATENT DOCUMENTS

| CA | 2279435 A1 * | 1/2001 | .............. F15B 1/024 |
| DE | 10 2009 043 034 A1 | 3/2011 | |
| DE | 10 2012 020 581 A1 | 4/2014 | |
| JP | WO 2007083517 A1 * | 7/2007 | .......... B30B 15/161 |

* cited by examiner

Primary Examiner — Logan Kraft
(74) Attorney, Agent, or Firm — Maginot, Moore & Beck LLP

(57) ABSTRACT

A hydraulic axle includes a reversible hydraulic pump. The hydraulic axle has a multi-surface cylinder with two retraction surfaces and two deployment surfaces. A first deployment surface and a first retraction surface are configured to interconnect with each other and separate from other surface during a rapid-traverse stroke. A pressure medium is configured to act on the second deployment surface to enable deployment.

17 Claims, 1 Drawing Sheet

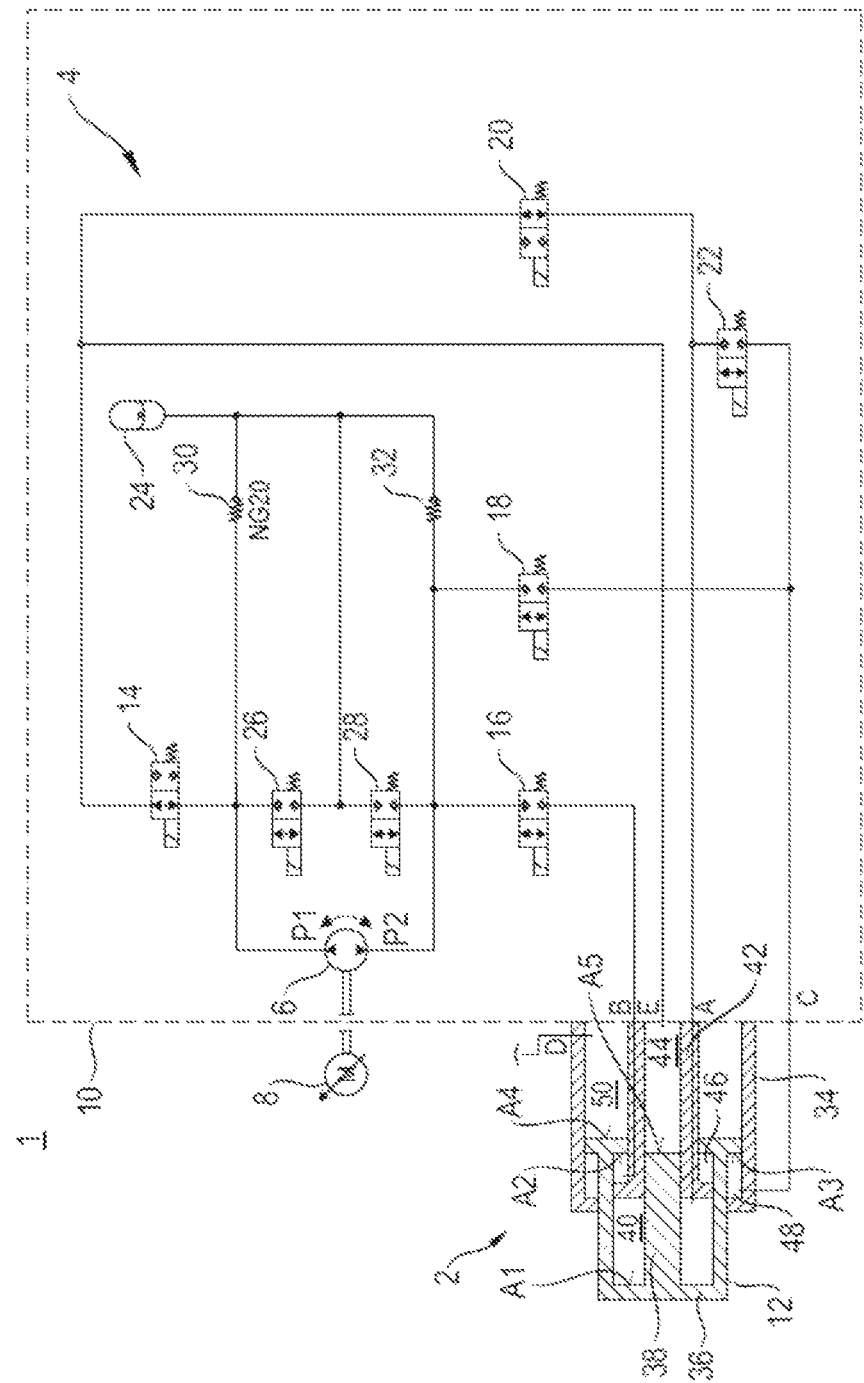

HYDRAULIC AXLE

This application claims priority under 35 U.S.C. §119 to patent application no. DE 10 2013 227 053.4, filed on Dec. 23, 2013 in Germany, the disclosure of which is incorporated herein by reference in its entirety.

BACKGROUND

The disclosure relates to a hydraulic axle.

In the context of this application, a hydraulic axle is to be understood to mean a hydraulic actuator, for example a hydraulic cylinder, and the hydraulic or electro-hydraulic control arrangement or circuit that charges the actuator with fluid. Such hydraulic axles are compact and powerful high-performance drives. They can be used for numerous industrial automation applications, for example in presses, plastics machines, bending machines and so forth. In particular, such drives are designed for realizing at least two movement profiles, specifically a fast transfer movement—hereinafter referred to as rapid-traverse stroke or rapid-traverse movement—and a force-imparting working movement—hereinafter referred to as power stroke, working movement or pressing stroke.

A known hydraulic axle is presented in the applicant's application DE 10 2009 043 034. A main cylinder, a rapid-traverse stroke cylinder and a hydraulic machine which can be reversed in terms of its direction of rotation are interconnected in a preloaded hydraulic system. By means of valves, the interconnection of the components can be varied such that one of several hydromechanical transmission ratios predefined for example by means of piston surfaces is selected. In this way, the said rapid-traverse movements or working movements can be performed in an efficient manner.

Furthermore, the applicant's DE 10 2012 020 581 discloses a hydraulic axle with a multi-surface cylinder. The latter has one deployment surface and two retraction surfaces. In the rapid-traverse stroke, the deployment surface and the first retraction surface are fluidically connected to one another by means of a regeneration valve and, together, have a pressure medium connection to the second retraction surface via a hydraulic pump. During the rapid-traverse deployment stroke of a piston of the multi-surface cylinder, for example, it is thus possible for the deployment surface and the first retraction surface to be connected to a high-pressure side of the hydraulic pump. The hydraulic pump then delivers pressure medium from the second retraction surface to the deployment surface and to the first retraction surface. A resulting exertion of pressure on the deployment surface and on the first retraction surface has the effect that numerous seals are subjected to a high pressure. In particular at seals of a chamber that is delimited by the outer, second retraction surface, the exertion of pressure leads to high friction resistances, such that in particular in the rapid-traverse stroke, high pressures are required to move the piston.

SUMMARY

By contrast, it is the object of the disclosure to provide a hydraulic axle in which a piston of a cylinder can be moved with less friction.

Said object is achieved by means of a hydraulic axle having the feature described below.

Further advantageous refinements of the disclosure are described in the claims and the FIGURE.

According to the disclosure, a hydraulic axle, in particular a compact axle, having a reversible hydraulic machine is provided. The hydraulic machine is preferably a hydraulic pump which is variable in terms of its rotational speed. Furthermore, the axle has a hydraulic circuit. The circuit has control valves for controlling a piston of a multi-surface cylinder, in particular of a five-surface cylinder. By means of the control valves, the piston can be moved in a rapid-traverse stroke and in a power stroke in two axial directions. According to the disclosure, the piston has two retraction surfaces (A2, A3) which can be acted on with pressure medium in a retraction direction. Furthermore, the piston has two deployment surfaces (A1, A5) which can be acted on with pressure medium in a deployment direction. It is preferably the case that, in the rapid-traverse stroke, the first deployment surface (A1) and the first retraction surface (A3) are interconnected in particular in substantially unpressurized fashion by means of the circuit and are in particular fluidically separated from the other surfaces. Furthermore, during a rapid-traverse deployment movement, the second deployment surface (A5) can be acted on with pressure medium by being connected to a high-pressure side of the hydraulic pump. The second retraction surface (A2) can be connected to the low-pressure side of the hydraulic pump.

This solution has the advantage that an additional deployment surface is provided in relation to the prior art in DE 10 2012 020 581 discussed in the introduction. In this way, a deployment surface and a retraction surface can be interconnected in unpressurized fashion, and the other surfaces can be correspondingly acted on for the purpose of displacing the piston. Thus, during the deployment movement, only one of the deployment surfaces is acted on with an elevated pressure or connected to the high-pressure side of the hydraulic pump. It is furthermore advantageous that, in the multi-surface cylinder, fewer seals are subjected to pressure in particular during the rapid-traverse deployment stroke than in the prior art. In this way, the piston can be moved with considerably lower friction, and is more free-moving.

It is advantageously the case that, during a rapid-traverse retraction movement, the second retraction surface (A2) is acted on with pressure medium and thus connected to the high-pressure side of the hydraulic pump. The first deployment surface (A1) and the first retraction surface (A3) can in this case again be interconnected in substantially unpressurized fashion by means of the circuit. The second deployment surface (A5) can be connected to a low-pressure side of the hydraulic pump. In this way, it is also the case during the rapid-traverse retraction stroke that a relatively small number of seals are subjected to a high pressure. In this way, the piston is extremely free-moving even during retraction movements.

In a further refinement of the disclosure, in the power deployment stroke, the deployment surfaces (A1, A5) are interconnected. In this way, large surfaces are advantageously provided for the power stroke.

It may additionally be provided that, in the power deployment stroke, the retraction surfaces (A2, A3) are interconnected.

In an extremely simple manner in terms of control, it may be provided that, in the power deployment stroke, the interconnected retraction surfaces (A2, A3) are connected via the hydraulic machine to the interconnected deployment surfaces (A1, A5). It is thus possible for pressure medium to be delivered by the hydraulic machine from the retraction surfaces (A2, A3) to the deployment surfaces (A1, A5).

It is preferably the case that, in the power retraction stroke of the piston, the retraction surfaces (A2, A3) are interconnected in parallel, whereby large surfaces are also available for the power retraction stroke.

In the power retraction stroke of the piston, it is also possible for the deployment surfaces (A1, A5) to be interconnected in parallel.

In an extremely simple manner in terms of control, it may be provided that, also in the power retraction stroke of the piston, the interconnected retraction surfaces (A2, A3) are connected via the hydraulic machine to the interconnected deployment surfaces (A1, A5). Pressure medium is thus delivered in a simple manner from the deployment surfaces (A1, A5) to the retraction surfaces (A2, A3) for the purposes of a power retraction stroke.

In a further refinement of the disclosure, the first deployment surface (A1) and the first retraction surface (A3) are of substantially equal size. Then, if they are interconnected in the rapid-traverse stroke, one pressure surface merely delivers the pressure medium to the other pressure surface, without excess pressure medium having to be supplied or discharged, as would be necessary in the case of pressure surfaces of different size.

It is advantageously also the case that the second deployment surface (A5) and the second retraction surface (A2) are of substantially equal size. In this way it is for example possible here, too, for pressure medium to simply be delivered from one surface to the other surface in the rapid-traverse stroke.

In terms of apparatus, it is possible in a simple manner for a connecting valve to be provided for the interconnection of the first retraction surface (A3) and the first deployment surface (A1). The surfaces (A3, A1) can then be directly connected by means of said connecting valve.

In the deployment direction, the piston may have an additional, pressure-relieved surface (A4). The multi-surface cylinder is thus a five-surface cylinder, by contrast to the prior art in DE 10 2012 020 581 discussed in the introduction, in which a four-surface cylinder is provided.

The second deployment surface (A5) is preferably smaller than the first deployment surface (A1). In this way, in particular in the rapid-traverse deployment stroke of the piston, it is necessary only for the small or relatively small deployment surface (A5) to be acted on with pressure medium or with a pressure.

The second retraction surface (A2) is advantageously smaller than the first retraction surface (A3). In this way, in particular in the rapid-traverse retraction stroke of the piston, it is necessary only for the small retraction surface (A2) to be acted on with pressure medium or with a pressure.

It is possible, in a simple manner, for a first control valve to be provided for connecting the second deployment surface (A5) to a first pressure side of the hydraulic machine. For the second retraction surface (A2), a second control valve may be provided for connecting said surface to a second pressure side of the hydraulic machine. Furthermore, it may be provided that the first retraction surface (A3) can be connected by means of a third control valve to the second pressure side of the hydraulic machine. It is preferably also the case that the first deployment surface (A1) can be connected by means of a fourth control valve, and by means of the first control valve arranged fluidically with respect thereto, to the first pressure side of the hydraulic machine. Such an arrangement of control valves is particularly easy to implement in terms of apparatus and is thus inexpensive.

The control valves are for example designed, in a simple manner, as switchable 2/2 directional valves. A valve slide of the first, second and third control valve is in this case preferably acted on in the direction of a closed position by a spring force of a valve spring, and can be acted on in the direction of an open position by an actuation force of an actuator. By contrast, it may be provided that a valve slide of the fourth control valve is acted on in the direction of its open position by a spring force of a valve spring and can be acted on in the direction of its closed position by an actuation force of an actuator. The connecting valve may be designed correspondingly to the first, second or third control valve.

A hydraulic accumulator can preferably be fluidically connected directly to the first and/or second pressure side of the hydraulic machine. This is advantageous for a decompression of the cylinder after the power deployment or retraction stroke and/or for a pressure build-up phase for preloading the piston.

It may be provided that the hydraulic accumulator can be connected directly to the first pressure side of the hydraulic machine via a first accumulator valve and can be connected directly to the second pressure side of the hydraulic machine via a second accumulator valve. Furthermore, it may be provided that the hydraulic accumulator can be connected via a first check valve, which opens in the flow direction away from said hydraulic accumulator, to the first pressure side of the hydraulic machine, and via a second check valve, which opens in the flow direction away from said hydraulic accumulator, to the second pressure side of the hydraulic machine.

It is advantageously the case that the multi-surface cylinder and the hydraulic machine form a unit and are assembled together. Furthermore, the hydraulic circuit may be provided for the unit. It is conceivable for the hydraulic circuit to be arranged together with the hydraulic machine in a valve block. A drive unit that drives the hydraulic machine can be connected to said valve block. In this way, a compact axle is realized in a simple manner.

The piston of the multi-surface cylinder may have an annular space which is formed by an inner axial piston rod which is fixed to the piston. Said piston rod may protrude into an approximately hollow cylindrical guide rod which is fixed to a housing. The guide rod in turn may protrude, together with an outer radial collar, into the annular space. Conversely, the piston may protrude by way of an outer and an inner radial collar of its outer shell into an annular space which is delimited by the guide rod and by an outer housing. A structurally simple five-surface cylinder is realized in this way.

An annular base surface of the piston may then form the first deployment surface (A1). A face surface of the piston rod may constitute the second deployment surface (A5). An annular surface, pointing toward the base surface, of the inner radial collar of the piston may be provided as a second retraction surface (A2). An annular surface, pointing toward the base surface, of the outer radial collar of the piston is then preferably the first retraction surface (A3). An annular face surface, pointing away from the base surface, of the piston may in turn be connected to the atmosphere and constitute the pressure-relieved surface (A4).

The outer radial collar of the guide rod and the inner radial collar of the piston may engage behind one another.

BRIEF DESCRIPTION OF THE DRAWINGS

A preferred embodiment of the disclosure will be explained in more detail below on the basis of a drawing.

The FIGURE shows the hydraulic axle according to the disclosure in a hydraulic circuit diagram.

DETAILED DESCRIPTION

The single FIGURE illustrates a hydraulic axle 1. This has a multi-surface cylinder 2 (five-surface cylinder) which can be controlled by means of a hydraulic circuit 4. For the supply of pressure medium, a reversible hydraulic pump 6 is provided which can be driven, with variable rotational speed, in two directions of rotation by a drive unit 8. The circuit 4 with the hydraulic pump 6 is arranged in a valve block 10 to which the drive unit 8 and the multi-surface cylinder 2 are connected. From the multi-surface cylinder 2, four pressure ports A, B, C and E are provided on the valve block 10. A first deployment surface A1 of a piston 12 of the multi-surface cylinder 2 is connected to the pressure port A. A second retraction surface A2 of the piston 12 is fluidically connected to the pressure port B. A first retraction surface A3 of the piston 12 is in turn connected to the pressure port C. A further, second deployment surface A5 of the piston 12 is connected to the pressure port E. Furthermore, a surface A4 which acts in the deployment direction is connected to a pressure port D, which in turn is connected to the atmosphere, whereby the surface A4 is relieved of pressure. The first, outer annular retraction surface A3 is of equal size to the first annular deployment surface A1. The circular second deployment surface A5 and the annular second, inner retraction surface A2 are likewise of equal size. The small second deployment surface A5 is connected by means of a first switching valve 14 (control valve) to a first pressure side P1 of the hydraulic pump 6. The second retraction surface A2 is connected by means of a second switching valve 16 (control valve) to a second pressure side P2 of the hydraulic pump 6. Fluidically in parallel with respect to the second switching valve 16, a third switching valve 18 (control valve) is connected to the second pressure side P2 of the hydraulic pump 6, which third switching valve can connect the first retraction surface A3 to the second pressure side P2. A fourth switching valve 20 (control valve) is arranged fluidically in series with respect to the first switching valve 14, wherein the first switching valve 14 is arranged between the fourth switching valve 20 and the hydraulic pump 6. Said fourth switching valve can connect the first deployment surface A1 to the second deployment surface A5 and, when the first switching valve 14 is open, can connect the first deployment surface A1 to the first pressure side P1. The connection to the second deployment surface A5 is provided fluidically between the first switching valve 14 and the fourth switching valve 20.

The first deployment surface A1 and the first retraction surface A3 can be interconnected by means of a connecting valve 22 (switching valve). The connecting valve 22 is connected to the pressure medium flow path between the first deployment surface A1 and the fourth switching valve 20. The connection to the third switching valve 18 branches off from the pressure medium flow path between the first retraction surface A3 and the connecting valve 22.

The circuit 4 furthermore has a hydraulic accumulator 24. Said hydraulic accumulator can be connected by means of a first accumulator valve 26 (switching valve) to the first pressure side P1 and by means of a second accumulator valve 28 (switching valve) to the second pressure side P2 of the hydraulic pump 6. In this case, the first accumulator valve 26 is connected to the pressure medium flow path between the hydraulic pump 6 and the first switching valve 14, and the second accumulator valve 28 is connected to the pressure medium flow path between the hydraulic pump 6 and the second switching valve 16. Furthermore, said accumulator valves are jointly connected to the hydraulic accumulator 24. A respective check valve 30 and 32 is provided fluidically in parallel with respect to the respective accumulator valve 26 and 28. Said check valves open in each case in a pressure medium flow direction away from the hydraulic accumulator 24 toward the first pressure side P1 or second pressure side P2 respectively.

The piston 12 of the multi-surface cylinder 2 is guided slidingly in a cylinder housing 34. Said piston is of hollow cylindrical form, wherein an inner piston rod 38 extends axially in the interior of said piston proceeding from its base 36. A hollow cylindrical guide rod 42, which is fixed with respect to the housing, protrudes by way of its shell into the annular chamber 38 thus formed. The piston rod 38 in turn protrudes into a cylinder chamber 44, which is delimited by the shell, of the guide rod 42. The guide rod 42 has an outer radial collar on its end and the piston 36 has an inner radial collar, wherein these engage behind one another and delimit an annular space 46. Furthermore, the piston 12 has an outer radial collar by means of which it, together with the cylinder housing 34, delimits a further, outer annular space 48. The first deployment surface A1 is thus acted on with pressure medium via the annular chamber 40. The second deployment surface A5 is acted on with pressure medium via the cylinder chamber 44. The second and first retraction surfaces A2, A3 are acted on with pressure medium via the annular chambers 46 and 48 respectively. The pressure-relieved surface A4, together with an inner shell surface of the cylinder housing 34 and an outer shell surface of the guide rod 42, delimits a pressure-relieved annular space 50. In this case, the surface A4 points away from the surfaces A2 and A3.

The mode of operation of the hydraulic axle will be described below.

Rapid-Traverse Deployment Stroke:

In the rapid-traverse deployment stroke, the hydraulic pump 6 delivers pressure medium from its second pressure side P2 to its first pressure side P1. Actuators of the switching valves 14 and 16 are energized and the switching valves 14, 16 are thus open. The actuator of the fourth switching valve 20 is likewise energized, as a result of which said fourth switching valve is closed. Furthermore, the actuator of the connecting valve 22 is energized, and said connecting valve is thus open. The other switching valves 18, 26 and 28 are deenergized, and closed. Owing to the connecting valve 22 being open, the second deployment surface A1 and the first retraction surface A3, which is of equal size, are interconnected and separated from the other piston surfaces. The hydraulic pump 6 now delivers pressure medium from the second retraction surface A2 via the switching valve 16 to the switching valve 14 and onward to the second deployment surface A5, as a result of which the piston 12 is deployed. During said deployment movement, therefore, only the second deployment surface A5 is subjected to pressure, as a result of which only a small number of seals of the multi-surface cylinder 2 are subjected to a high pressure. The piston 2 can thus be deployed in a freely moving manner.

Power Deployment Stroke:

In this case, the hydraulic pump 6 again delivers pressure medium from the second pressure side P2 to the first pressure side P1. Now, both deployment surfaces A1 and A5 are connected to the high-pressure side of the hydraulic pump 6, that is to say to the first pressure side P1. For this purpose, the switching valves 14 and 20 are open and the connecting valve 22 is closed. Furthermore, the first and second retraction surfaces A3, A2 have a pressure medium connection to the low-pressure side of the hydraulic pump 6, that is to say to its second pressure side P2. For this purpose, the switching valves 16 and 18, which are fluidically in parallel, are open. The accumulator valves 26 and 28 are closed. The hydraulic pump 6 now delivers pressure medium from the retraction surfaces A2, A3 via the switching valves 16, 18 to the deployment surfaces A1 and A5 via the switching valves 14 and 20.

Decompression after the Power Deployment Stroke:

In the decompression after the power deployment stroke, the deployment surfaces A1 and A5 are connected to the hydraulic accumulator 24, and the retraction surfaces A2 and A3 are shut off. For the connection of the deployment surfaces A1 and A5 to the hydraulic accumulator 24, the first switching valve 14 and the fourth switching valve 20 are opened. Furthermore, the second accumulator valve 28 is opened. The second switching valve 16, the third switching valve 18 and the connecting valve 22 are closed. The hydraulic pump 6 delivers pressure medium from its first pressure side P1 to its second pressure side P2. Thus, pressure medium is delivered from the first deployment surface A1 and the second deployment surface A5 via the fourth switching valve 20 and the first switching valve 14 to the hydraulic accumulator 24 via the second switching valve 28.

Rapid-Traverse Retraction Stroke:

In the rapid-traverse retraction stroke, the hydraulic pump 6 delivers pressure medium from its first pressure side P1 to its second pressure side P2. The first deployment surface A1 and the first retraction surface A3 are interconnected by means of the connecting valve 22 and are fluidically separated from the other piston surfaces. The first and second switching valves 14 and 16 are open. The third and fourth switching valves 18 and 20 are closed. Furthermore, the accumulator valves 26 and 28 are closed. The hydraulic pump 6 now delivers pressure medium from the second deployment surface A5 via the first switching valve 14 to the second retraction surface A2 via the second switching valve 16.

Power Retraction Stroke:

In this case, the hydraulic pump 6 delivers pressure medium from its first pressure side P1 to its second pressure side P2. In the power retraction stroke, pressure medium is delivered from the deployment surfaces A1 and A5 to the retraction surfaces A2 and A3. For this purpose, all of the switching valves 14 to 20 are open. The accumulator valves 26, 28 and the connecting valve 22 are closed. The hydraulic pump 6 then delivers pressure medium from the deployment surfaces A1 and A5 via the switching valves 14, 20 to the retraction surfaces A2 and A3 via the switching valves 16, 18.

Decompression after the Power Retraction Stroke:

The hydraulic pump 6 delivers pressure medium from its second pressure side P2 to its first pressure side P1. In the decompression, the retraction surfaces A2 and A3 are connected to the hydraulic accumulator 24, whereas the deployment surfaces A1 and A5 are shut off. The second and third switching valves 16 and 18 and the first accumulator valve 26 are open. The first switching valve 14 and the connecting valve 22 are closed. If required, the fourth switching valve 20 may also be closed. The hydraulic pump 6 now delivers pressure medium from the retraction surfaces A2 and A3 via the switching valves 16 and 18 to the hydraulic accumulator 24 via the accumulator valve 26.

Pressure-Holding Phase:

In the pressure-holding phase, all of the switching valves 14 to 20 and the connecting valve 22 are closed in order that pressure medium at the deployment surfaces A1, A5 and at the retraction surfaces A2, A3 cannot escape, and the piston 12 is braced in its position.

Pressure Build-Up Phase for Preloading:

In the pressure build-up phase for preloading, the deployment surfaces A1 and A5 and the retraction surfaces A2 and A3 are connected to the hydraulic accumulator 24. The hydraulic pump 6 delivers pressure medium from the first pressure side P1 to the second pressure side P2. The first switching valve 14 and the accumulator valves 26 and 28 are closed. The switching valves 16, 18 and 20 and the connecting valve 22 are open. The hydraulic pump 6 can now deliver pressure medium from the hydraulic accumulator 24 via the first check valve 30 to the deployment surfaces A1 and A5 and to the retraction surfaces A2 and A3.

The disclosure discloses a hydraulic axle with a reversible hydraulic pump. The axle has a multi-surface cylinder with two retraction surfaces and two deployment surfaces. In a rapid-traverse stroke, a first deployment surface and a first retraction surface can be interconnected and separated from the other surfaces. For deployment, the second deployment surface is acted on with pressure medium.

LIST OF REFERENCE SIGNS

1 Hydraulic axle
2 Multi-surface cylinder
4 Circuit
6 Hydraulic pump
8 Drive unit
10 Valve block
12 Piston
14 First switching valve
16 Second switching valve
18 Third switching valve
20 Fourth switching valve
22 Connecting valve
24 Hydraulic accumulator
26 First accumulator valve
28 Second accumulator valve
30 First check valve
32 Second check valve
34 Cylinder housing
36 Base
38 Piston rod
40 Annular chamber
42 Guide rod
44 Cylinder chamber
46 Annular space
48 Annular space
50 Annular space
A1 First deployment surface
A2 Second retraction surface
A3 First retraction surface
A4 Pressure-relieved surface
A5 Second deployment surface
P1 First pressure side
P2 Second pressure side

What is claimed is:

1. A hydraulic axle, comprising:
a reversible hydraulic machine;
a multi-surface cylinder that includes a piston which has:
a first and second retraction surfaces; and
a first and second deployment surfaces;

a hydraulic circuit that includes control valves configured to actuate the piston during a rapid-traverse stroke and during a power stroke, the control valves including:
- a first control valve configured to connect the second deployment surface to a first pressure side of the reversible hydraulic machine,
- a second control valve configured to connect the second retraction surface to a second pressure side of the reversible hydraulic machine,
- a third control valve configured to connect the first retraction surface to the second pressure side of the reversible hydraulic machine, and
- a fourth control valve configured to connect the first deployment surface to the first pressure side of the reversible hydraulic machine, the first control valve arranged fluidically in series with the fourth control valve to enable the fourth control valve to connect the first deployment surface to the first pressure side of the reversible hydraulic machine; and a hydraulic accumulator connected to each of the first and second pressure sides of the reversible hydraulic machine, wherein:
during the rapid-traverse stroke, the first deployment surface and the first retraction surface are configured to interconnect in a substantially unpressurized fashion via the hydraulic circuit; and
during a rapid-traverse deployment stroke, a pressure medium is configured to act on the second deployment surface.

2. The hydraulic axle according to claim 1, wherein during a rapid-traverse retraction stroke, the pressure medium is configured to act on the second retraction surface and the first deployment surface and first retraction surface are configured to interconnect in a substantially unpressurized fashion via the hydraulic circuit.

3. The hydraulic axle according to claim 1, wherein during a power deployment stroke, the first and second deployment surfaces are configured to interconnect, and the first and second retraction surfaces are configured to interconnect.

4. The hydraulic axle according to claim 3, wherein, during the power deployment stroke, the reversible hydraulic machine is configured to connect the interconnected first and second retraction surfaces to the interconnected first and second deployment surfaces.

5. The hydraulic axle according to claim 3, wherein during a decompression after the power deployment stroke, the first and second deployment surfaces are connected to the hydraulic accumulator, and the first and second retracting surfaces are isolated from the reversible hydraulic machine.

6. The hydraulic axle according to claim 1, wherein, during a power retraction stroke, the first and second deployment surfaces are configured to interconnect, and the first and second retraction surfaces are configured to interconnect.

7. The hydraulic axle according to claim 6, wherein, during the power retraction stroke, the reversible hydraulic machine is configured to connect the interconnected first and second retraction surfaces to the interconnected first and second deployment surfaces.

8. The hydraulic axle according to claim 6, wherein during a decompression after the power retraction stroke, the first and second retraction surfaces are connected to the hydraulic accumulator, and the first and second deployment surfaces are isolated from the reversible hydraulic machine.

9. The hydraulic axle according to claim 1, wherein at least one of:
the first deployment surface and the first retraction surface are of a substantially equal size; and
the second deployment surface and the second retraction surface are of a substantially equal size.

10. The hydraulic axle according to claim 1, further comprising a connecting valve configured to interconnect the first retraction surface and the first deployment surface.

11. The hydraulic axle according to claim 1, wherein at least one of:
the second deployment surface is smaller than the first deployment surface; and
the second retraction surface is smaller than the first retraction surface.

12. The hydraulic axle according to claim 1, further comprising switching valves arranged in a common valve block together with the reversible hydraulic machine and the hydraulic accumulator, wherein the multi-surface cylinder is configured to connect with the valve block.

13. The hydraulic axle according to claim 1, further comprising a first switching valve configured to connect the first pressure side of the reversible hydraulic machine to the hydraulic accumulator, and a second switching valve configured to connect the second pressure side of the reversible hydraulic machine to the hydraulic accumulator.

14. The hydraulic axle according to claim 13, wherein:
during a power deployment stroke, the first and second deployment surfaces are configured to interconnect, and the first and second retraction surfaces are configured to interconnect, and
during a decompression after the power deployment stroke, the second switching valve is in an open position so to connect the first and second deployment surfaces to the hydraulic accumulator.

15. The hydraulic axle according to claim 13, wherein:
during a power retraction stroke, the first and second deployment surfaces are configured to interconnect, and the first and second retraction surfaces are configured to interconnect, and
during a decompression after the power retraction stroke, the first switching valve is in an open position so as to connect the first and second retraction surfaces to the hydraulic accumulator.

16. The hydraulic axle according to claim 13, further comprising a connecting valve configured to interconnect the first retraction surface and the first deployment surface,
wherein, during a pressure build-up for preloading the piston, the first control valve is in a closed position, the second, third, and fourth control valves are each in an open position, the connecting valve is in an open position, and the first and second switching valves are each in a closed position such that the first and second deployment surfaces and the first and second retraction surfaces are connected to the accumulator.

17. The hydraulic axle according to claim 1, wherein the second control valve is not arranged fluidically in series with the third control valve.

* * * * *